US012177538B2

(12) United States Patent
Góes et al.

(10) Patent No.: US 12,177,538 B2
(45) Date of Patent: Dec. 24, 2024

(54) LIVE STUDIO

(71) Applicant: InEvent, Inc., Wilmington, DE (US)

(72) Inventors: Pedro Peçanha Martins Góes, Atlanta, GA (US); Mauricio Cucolo Giordano, Atlanta, GA (US); Vinicius Figueredo Neris, New York, NY (US)

(73) Assignee: InEvent, Inc., Wilmington, DE (US)

( * ) Notice: Subject to any disclaimer, the term of this patent is extended or adjusted under 35 U.S.C. 154(b) by 0 days.

(21) Appl. No.: 18/113,229

(22) Filed: Feb. 23, 2023

(65) Prior Publication Data
US 2024/0107128 A1   Mar. 28, 2024

Related U.S. Application Data

(60) Provisional application No. 63/408,965, filed on Sep. 22, 2022.

(51) Int. Cl.
| | |
|---|---|
| *H04N 21/854* | (2011.01) |
| *H04N 5/265* | (2006.01) |
| *H04N 21/2368* | (2011.01) |
| *H04N 21/4788* | (2011.01) |
| *H04N 21/81* | (2011.01) |
| *H04N 21/845* | (2011.01) |

(52) U.S. Cl.
CPC .......... *H04N 21/854* (2013.01); *H04N 5/265* (2013.01); *H04N 21/2368* (2013.01); *H04N 21/4788* (2013.01); *H04N 21/8126* (2013.01); *H04N 21/845* (2013.01)

(58) Field of Classification Search
CPC ............ H04N 21/854; H04N 21/2368; H04N 21/4788; H04N 21/8126; H04N 21/845
See application file for complete search history.

(56) References Cited

U.S. PATENT DOCUMENTS

| | | | | |
|---|---|---|---|---|
| 2020/0186887 | A1* | 6/2020 | Kwon | G11B 27/34 |
| 2021/0160549 | A1* | 5/2021 | Makinen | H04N 21/44008 |
| 2021/0327470 | A1 | 10/2021 | Hooper et al. | |
| 2021/0337248 | A1* | 10/2021 | Huang | H04N 5/265 |
| 2022/0014577 | A1 | 1/2022 | Thomas | |

FOREIGN PATENT DOCUMENTS

EP     3908006 A2    11/2021

OTHER PUBLICATIONS

International Searching Authority, "International Search Report and Written Opinion", in International Application No. PCT/US2023/030658 dated Jun. 8, 2023, pp. 1-11.

* cited by examiner

*Primary Examiner* — Pinkal R Chokshi
(74) *Attorney, Agent, or Firm* — Hickman Becker Bingham Ledesma LLP

(57) ABSTRACT

Techniques are described herein for editing video that is being streamed from one or more remote streaming sources without the latency experienced by prior approaches. Unlike prior approaches, the video editing is performed by one or more server devices that belong to the cloud network to which the original content streams are being transmitted. The editing performed by the cloud-based server devices is based on production commands received from a remote production-control device that does not belong to the cloud. However, because video does not need to make a round-trip from the cloud network and the remote production-control device, latency in generation of the output video is significantly reduced.

16 Claims, 9 Drawing Sheets

LIVE STUDIO

CROSS-REFERENCE TO RELATED APPLICATIONS; BENEFIT CLAIM

This application claims the benefit of Provisional Application 63/408,965, filed Sep. 22, 2022, the entire contents of which is hereby incorporated by reference as if fully set forth herein, under 35 U.S.C. § 119(e).]

FIELD OF THE INVENTION

The present invention relates to editing video and, more specifically, to techniques for editing, in real-time, video that is being streamed from remote sources.

BACKGROUND

Tools for editing digital video have been in use since the invention of digital video. FIG. 1A is an example of how conventional video editing was performed. Referring to FIG. 1A, digital video editing was typically performed after the video was recorded (pre-recorded video 102) using a computing device that was local to the storage upon which the digital video was stored (editing device 106). After a video was edited with a local editing device 106, the locally-produced video 118 can be distributed in a variety of ways. FIG. 1A illustrates a scenario in which the locally-produced video 118 is uploaded to a cloud network 100. A video distribution service 104 may obtain the locally-produced video 118 from the cloud network and distribute the locally-produced video 118 to remote audience devices 130.

In recent years, there have been efforts to perform on-the-fly editing of video that is not pre-recorded. For example, editing device 106 may receive streams from local streaming sources 132 and 134, and produce a locally-produced video 118 therefrom. Such streams may be, for example, from digital cameras at football game. Because the editing device 106 is local to the streaming sources 132 and 134, the transmission of the video from streaming sources 132 and 134 to the editing device 106 does not typically contribute significantly to the viewing latency experienced by audience devices 130. However, because the transmission speed between editing device 106 and cloud network 100 is significantly slower than local connections, the need to upload the locally-produced video 118 to cloud network can add significant latency. Consequently, those viewing the football game on audience devices 130 may experience a viewing delay of a few seconds.

It has now become common for video to come from remote sources. Referring to FIG. 1C, it is similar to FIG. 1B except that the locally-produced video 118 is being produced based on original streams being produced by remote streaming sources 142 and 144. Specifically, remote streaming sources transmit their respective content streams to cloud network 100, and cloud network 100 transmits the streams to editing device 106. Editing device produces locally-produced video 118 from the original streams, and transmits the locally-produced video 118 back to cloud network 100. The locally-produced video 118 may then be distributed as needed to audience devices 130 through video distribution service 104. Unfortunately, during the scenario illustrated in FIG. 1C, the distribution of the video incurs numerous significant delays:

the transmission of the original streams from the remote streaming sources 142, 144 to the cloud network 100 the transmission of the original streams from the cloud network 100 to the editing device 106 the transmission of the locally-produced video 118 from the editing device 106 to the cloud network 100 the transmission of the locally-produced video 118 from the cloud network 100 to the video distribution service and audience devices 130.

Not only does each of these non-local video transmissions add to the delay experienced by audience devices 130, but significant bandwidth is required between the cloud network 100 and editing device 106. The bandwidth required is particularly high in situations where the locally-produced video 118 is being produced based on a large number of remotely-located high-resolution original streams.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for editing video that is being streamed from one or more remote streaming sources without the latency experienced by prior approaches. Unlike prior approaches, the video editing is not performed by a local computing device that must receive the original streams from the cloud network 100 and transmit the edited video to the cloud network 100. Instead, editing is performed by one or more server devices that belong to the cloud network to which the original content streams are being transmitted. The editing performed by the cloud-based server devices is based on production commands received from a remote production-control device that does not belong to the cloud. However, because video does not need to make a round-trip from the cloud network 100 and the remote production-control device, latency in generation of the output video is significantly reduced.

Figure 1A:
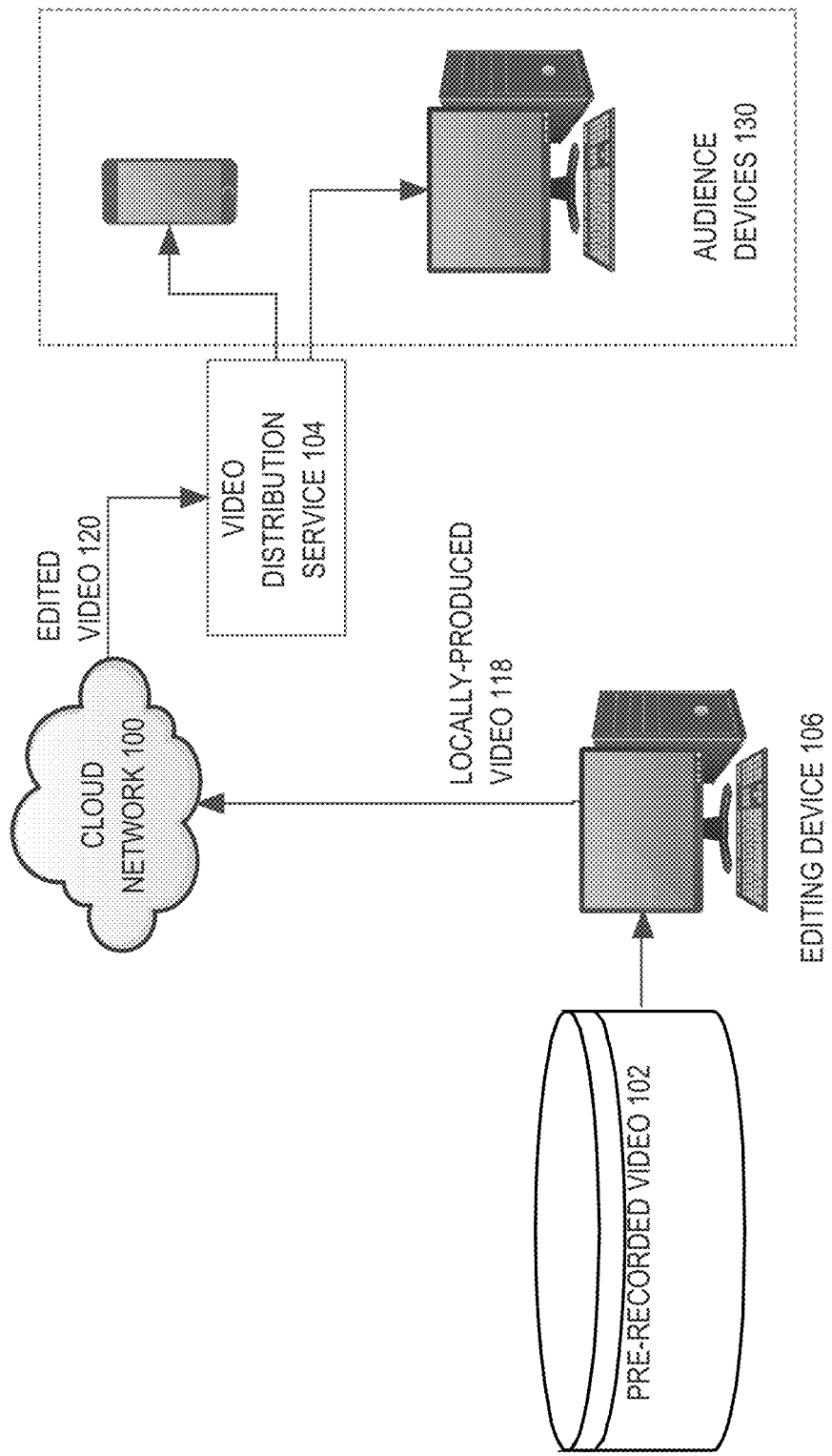
FIG. 1A is a block diagram of a system in which a pre-recorded video is edited prior to editing and distribution.
Figure 1B:
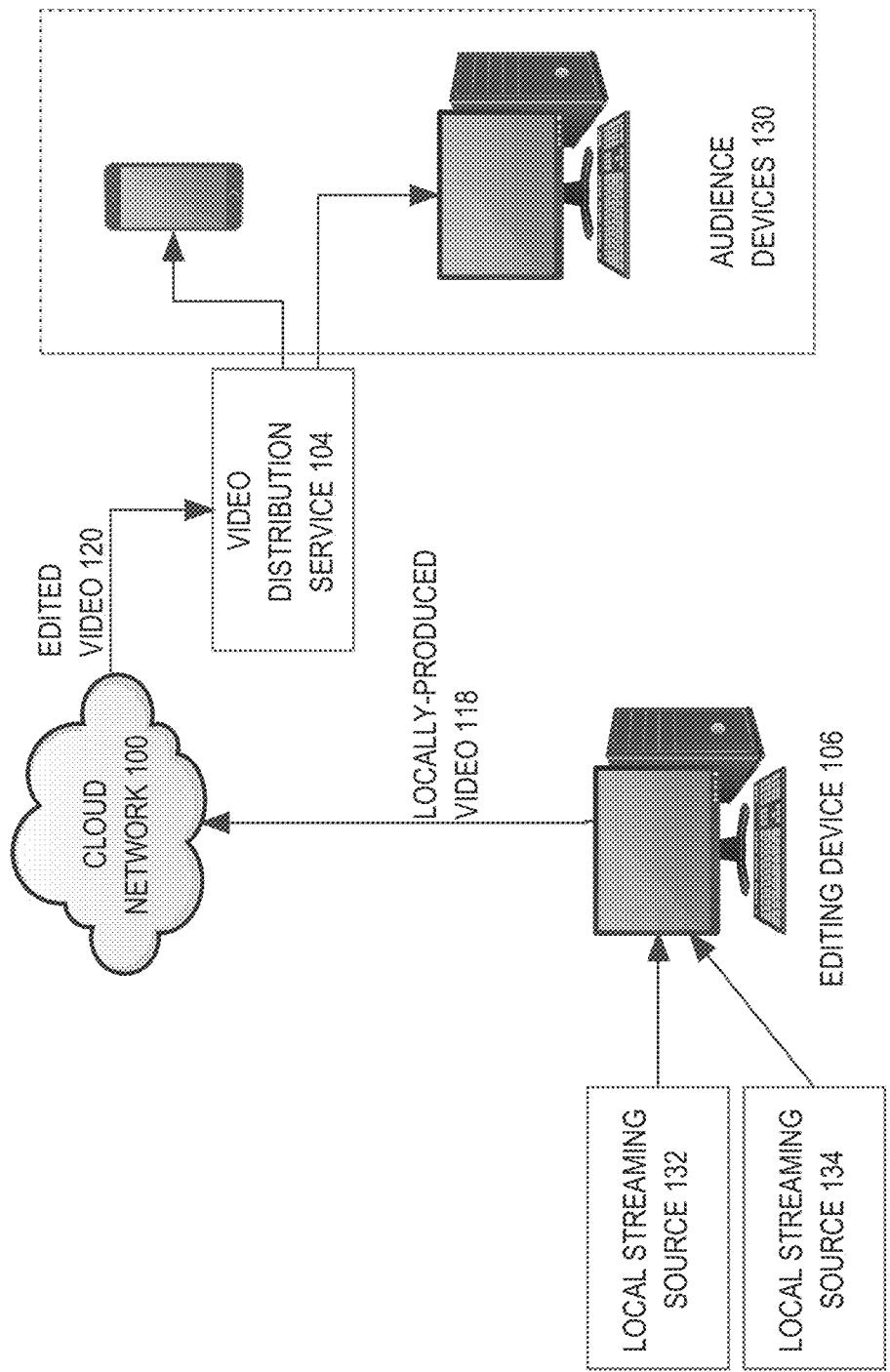
FIG. 1B is a block diagram of a system in which local streaming sources are used to produce a single edited video that is uploaded to a cloud for distribution.
Figure 1C:
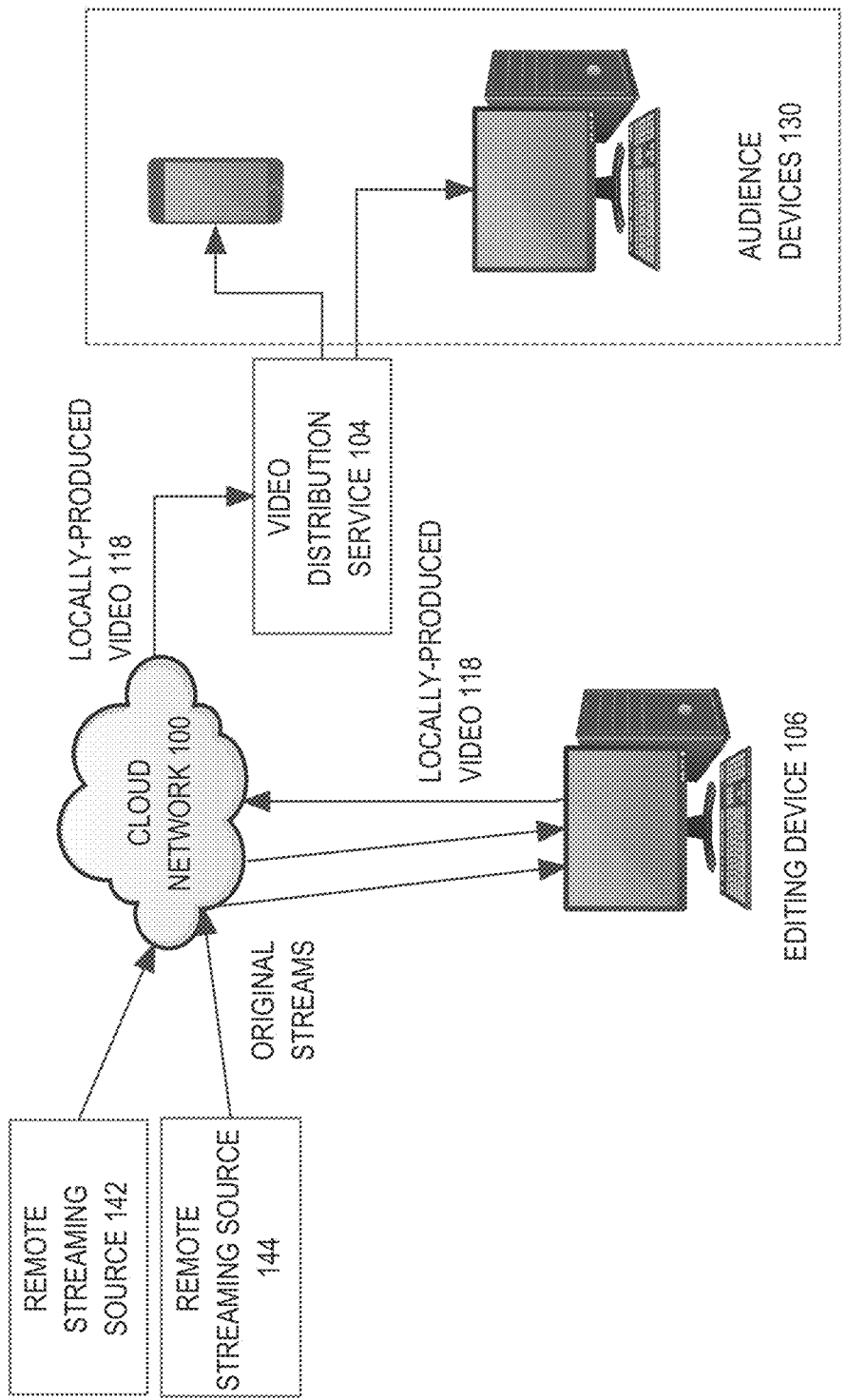
FIG. 1C is a block diagram of a system in which content streams from remote streaming sources are used to produce a single edited video that is uploaded to a cloud for distribution.
Figure 1D:
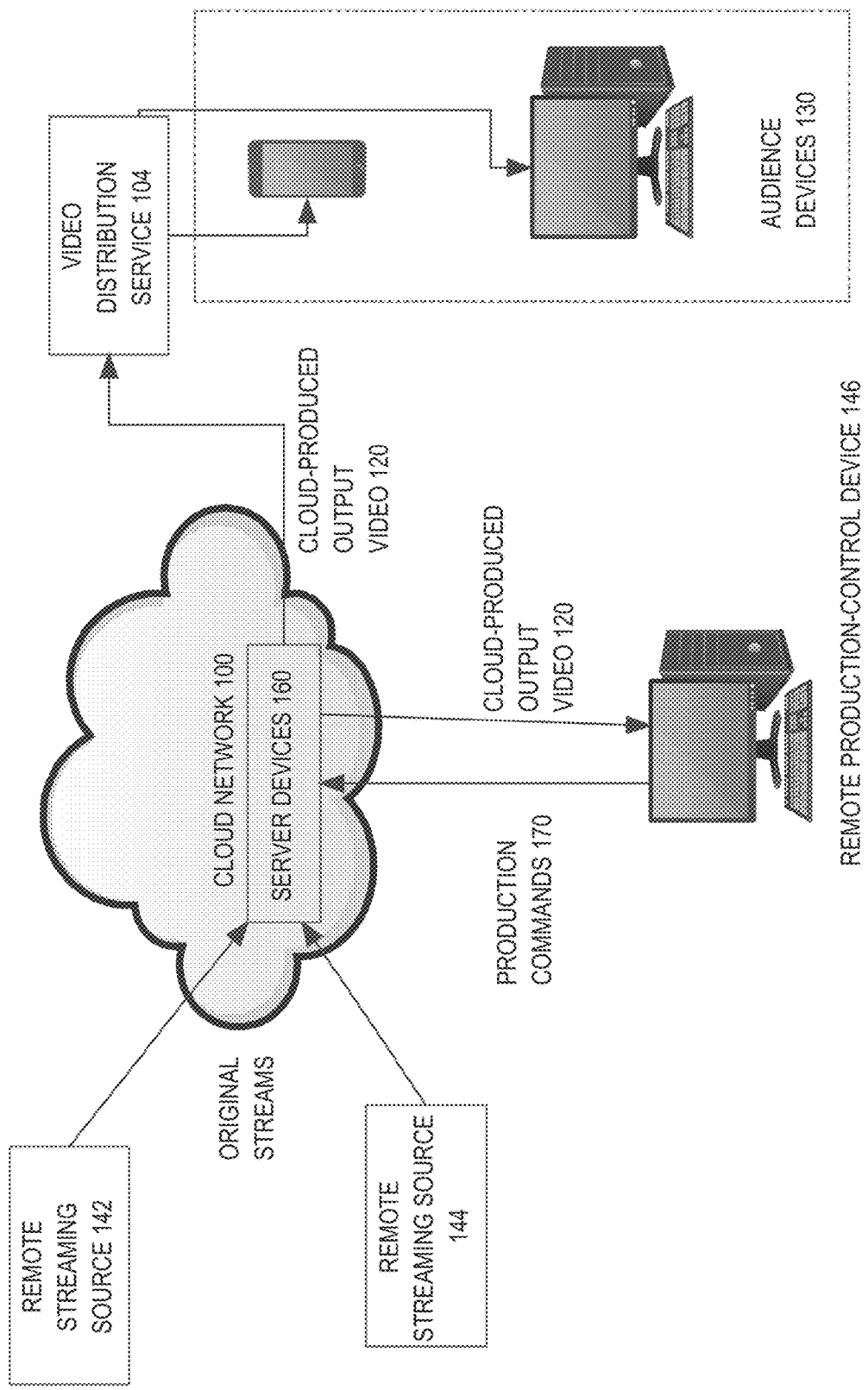
FIG. 1D is a block diagram of a system in which video editing is performed on server devices that belong to the cloud network based on production commands 170 received from a remote production-control device 146, according to an implementation.

Referring to FIG. 1D, it illustrates a system configured according to one implementation of the techniques described herein. The system includes remote streaming sources 142 and 144 that stream video to cloud network 100. Cloud network 100 includes one or more server devices 160 that receive the original streams from the remote streaming sources 142 and 144, and produce a cloud-produced output video 120 based on production commands 170 received from remote production-control device 146. Server devices 160 may also send the cloud-produced output video 120 directly to remote production-control device 146 so that remote production-control device 146 can preview the results of the production commands 170 in real-time. The server devices 160 may also provide the cloud-produced output video 120 in real time to a video distribution service 104. Because the video does not experience a round-trip between cloud network 100 and remote production-control device 146, the viewing delay experienced by audience devices 130 may be significantly less than occurs during prior approaches.

Remote Production User Interface

Figure 2:
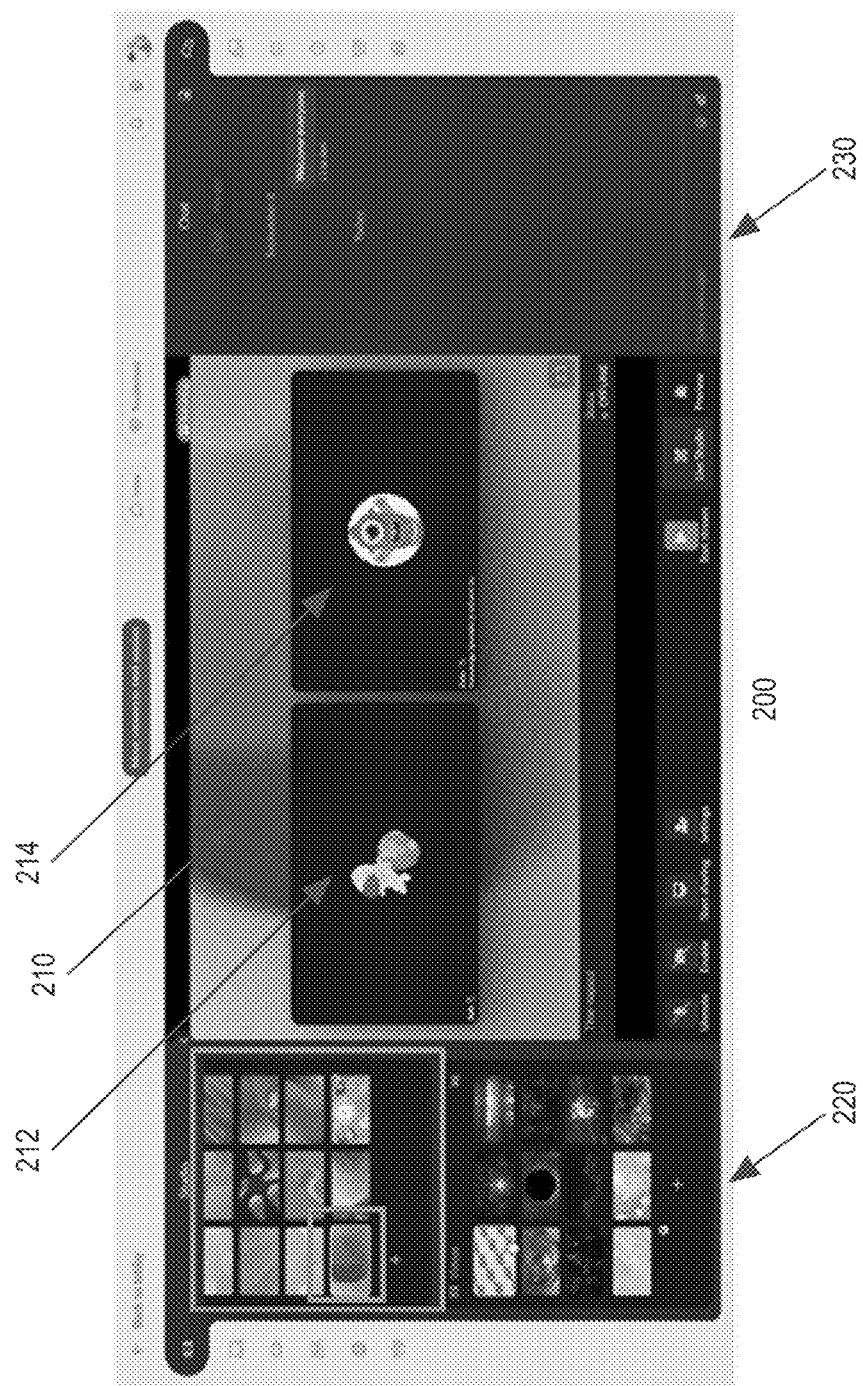
FIG. 2 is a block diagram of a user interface that may be displayed on a browser executing on a remote production-control device 146, according to an implementation.

As explained above, in the configuration illustrated in FIG. 1D, remote production-control device 146 does not actually produce the cloud-produced output video 120. Rather, remote production-control device 146 sends production commands to one or more server devices 160 in the cloud network 100. The server devices 160 receive the production commands 170 and apply them to the incoming original streams to produce a single cloud-produced output video 120. FIG. 2 illustrates a user interface 200 that is displayed to the user of remote production-control device 146 (hereinafter the "producer") to enable the producer to specify the production commands 170, according to one implementation.

Referring to FIG. 2, user interface 200 includes a region 210 that displays, in real-time, the cloud-produced output video 120 being produced by server devices 160. Region 210 includes two sub-regions 212, 214, each of which displays current content from a respective original content feed. Region 210 also displays a background image and/or video that has been previously selected by the producer using remote production-control device 146.

Significantly, the output video 120 displayed in region 210 is transmitted directly from server devices 160 to control device 146. Consequently, the producer sees the effects of the user's production commands 170 in near-real time (a delay of significantly less than a second), In contrast, the output video 120 passes through a video distribution service 104 prior to being viewed by the audience, which even for live feeds may incur a delay of several seconds.

Figure 3:
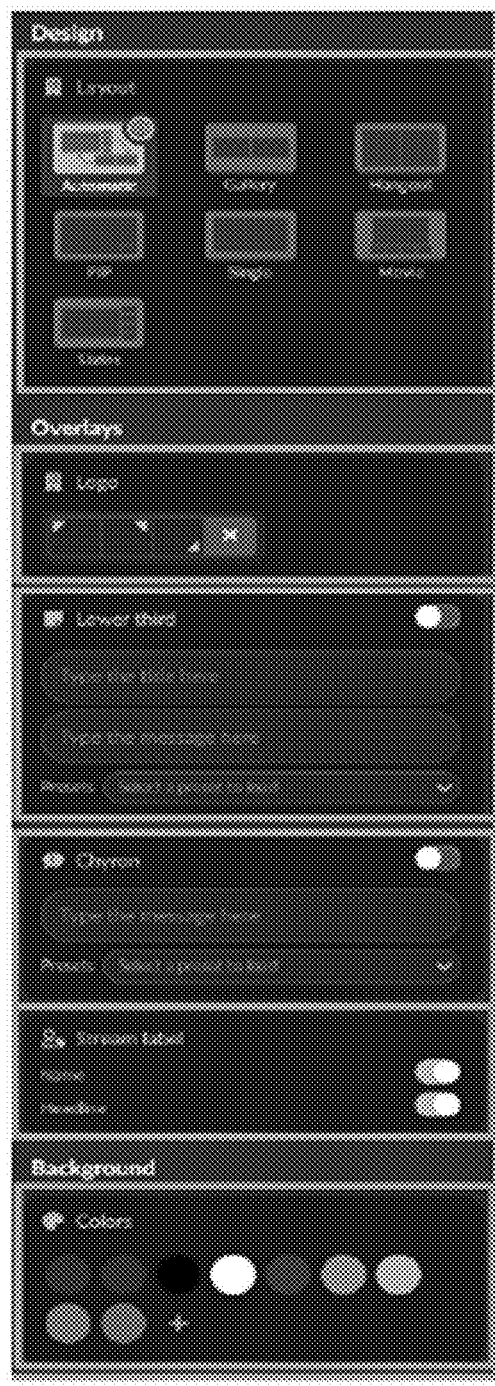
FIG. 3 is a block diagram illustrating a first set of production controls that may be accessed through the user interface illustrated in FIG. 2.
Figure 4:
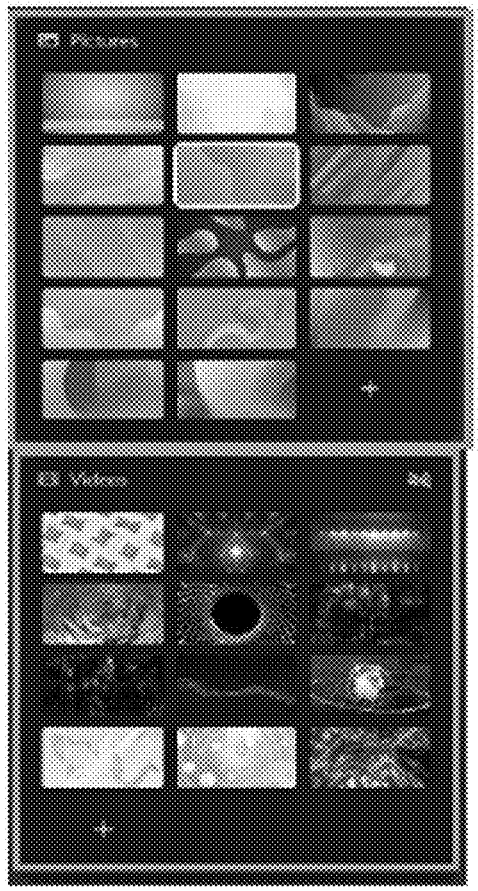
FIG. 4 is a block diagram illustrating a second set of production controls that may be accessed through the user interface illustrated in FIG. 2.

User interface 200 also includes a set of controls 220 to enable the producer to specify production commands 170 to be sent to the server devices 160. In the illustrated example, controls 220 include controls that allow the producer to change the background image/video of the cloud-produced output video 120. Controls for changing the background image/video of the edited video is merely one example of the many controls made available to the producer via user interface 200. FIG. 3 illustrates additional controls that may be displayed to the producer via user interface 200, including controls for selecting the layout, logo, lower third, chyron, stream label and background color for the cloud-produced output video 120. FIG. 4 illustrates controls for selecting the background image and/or background video for the cloud-produced output video 120. These controls are merely exemplary. The techniques described herein are not limited to any particular type of editing operations and/or controls.

The Chat Region

In addition to editing control, user interface 200 includes a chat region 230. Chat region 230 displays a chat dialog that is occurring while the cloud-produced output video 120 is being produced. According to one implementation, chat region 230 may display, in real time, a chat dialog that is occurring between the users of audience devices 130 (hereinafter "the audience"), between the audience and the users of remote streaming sources 142 and 144 (hereinafter "the presenters"), and/or between the producer and the audience. For example, the producer may take a poll of the audience using the chat interface. As another example, the producer may ask a question using the chat interface, and then use controls of the user interface 200 to cause the best answers, received through the chat interface, to be displayed within the cloud-produced output video 120.

Additional Tools

As mentioned above, the techniques described herein are not limited to any particular video editing tools. However, many tools benefit from the reduced latency due to an in-the-cloud video editing platform. For example, the presenters and/or audience may have controls for submitting questions. Any questions thus submitted may be viewed by the producer in a region of user interface 200 that is separate from the region that is displaying the cloud-produced output video 120 without the questions initially being incorporated into the cloud-produced output video 120. After the producer has determined that a question is appropriate for display, the producer may use an editing control to send a production command 170 to the one or more cloud-based server devices 160 to cause the cloud-produced output video 120 to include the question and, optionally, the name of the user that submitted the question. If the question came from a presenter associated with one of the original feeds, then the question may be displayed within the region of the output video that displays the feed associated with the presenter that submitted the question.

As another example, current tools let the presenters control the backgrounds of their individual original feeds. However, in addition to controlling the background for the cloud-produced output video 120, the producer may have controls to change the background in the individual feeds. This may be useful, for example, when the feeds are from presenters in a webinar. In such a scenario, the producer may cause the backgrounds of the individual feeds to be the same, which may include colors and/or logos associated with the company that is hosting the webinar.

Production commands 170 may include both production commands that are to be applied to the output video 120, and production commands that are to be applied to individual streams before they are combined into the output video 120. For example, production commands 170 may include commands to add on-the-fly transcription to one or more of the individual streams, to specify the resolution of one or more of the individual streams, to specify a background for one or more of the individual feeds, and/or to specify a volume level for the audio in one or more of the individual streams. These input-stream-specific edits may be made by server devices 160 prior to combining the individual input streams into the output video 120.

Details

The video streaming/editing architecture described herein provides the ability to use different layers of software, animations and assets to create one final video stream with all of them combined. The techniques provide highly engaging and interactive TV-like streaming experience to a variety of audiences across all devices. The techniques enhance the production quality of event broadcasts, allowing easy brand activation and customization of backgrounds, animated texts, chyrons and lower-thirds using a self-explanatory drag and drop producer.

Using the techniques described herein, users can edit real-time videos in simultaneous collaboration without having to upload files or use any external software. For example, the interface 200 that is displayed to the producer may simply be a web interface, displayed in a browser on remote production-control device 146, generated by software that is executing on server devices 160. In one embodiment, the system utilizes the RTMP technology allowing audiences to stream directly onto external channels, such as social media, in real time.

As illustrated in FIG. 1D, the system involves interconnecting multiple devices that are accessing the platform provided by server devices 160. Those devices may be used by all types of users, from the presenters of the event to the final audience. The live video and audio of the cloud-produced output video 120 may be streamed to a variety of outlets (video distribution service 104) including the social networks, web browsers and other broadcasting mediums. The live stream is equipped with live video editing capabilities made possible with a Layout controller module.

The techniques described herein address the problem with traditional multimedia streaming systems by enabling event hosts edit real-time live streams in simultaneous collaboration without having to upload files or use any external software. Also, the system allows a variety of input options including microphones, cameras, HDMI, USB, screen sharing, or pre-recorded videos. The technology also allows for switching cameras, microphones, and other hardware and electronics components during the stream via the hardware module.

Figure 5:
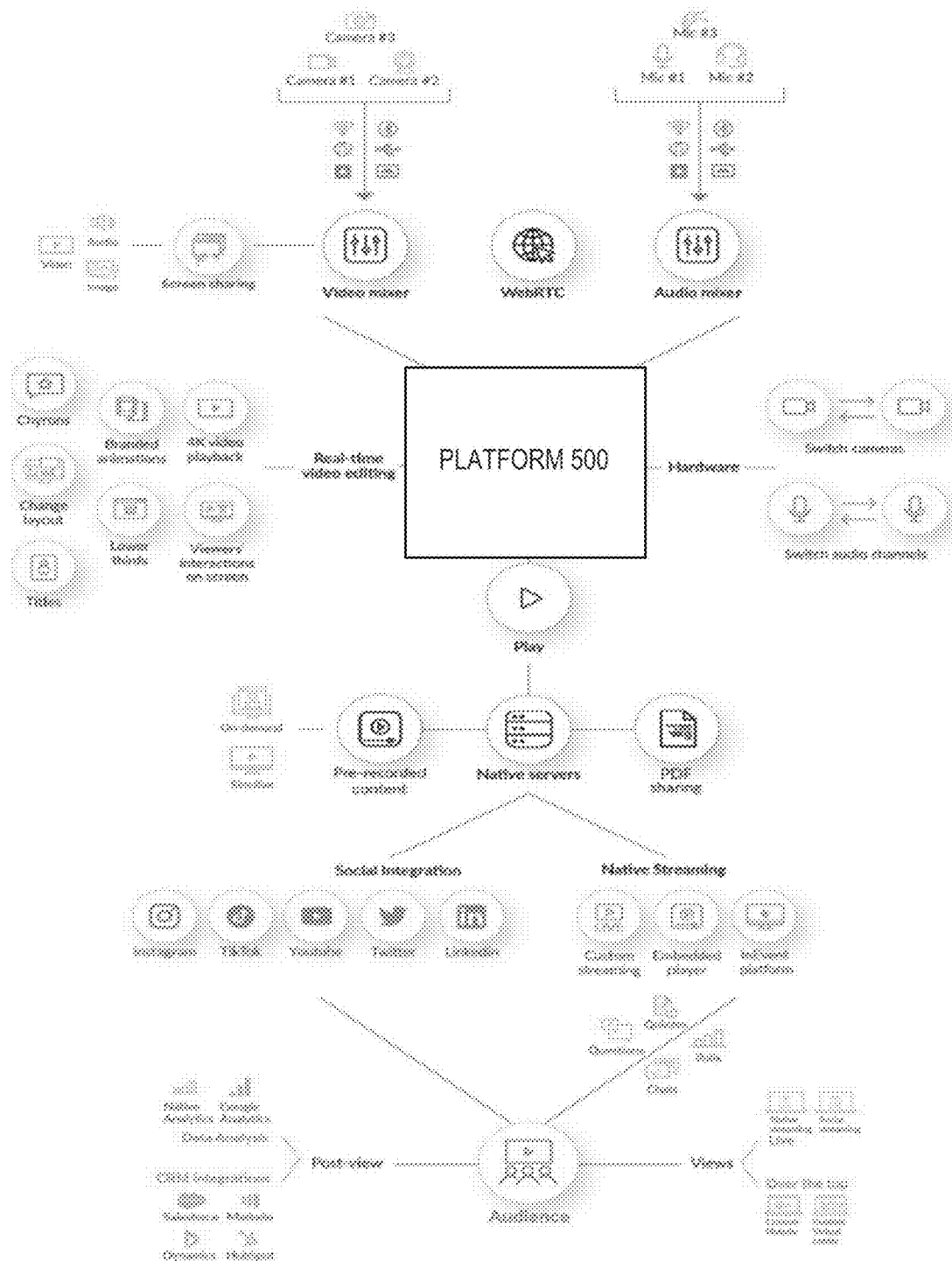
FIG. 5 is a block diagram illustrating the various type of devices and services that may be involved in a video production system that uses the techniques described herein, according to an implementation.

FIG. 5 is a block diagram of a cloud-based video production platform, provided by software being executed by cloud-based server devices 160, in greater detail. Referring to FIG. 5, it illustrates the involvement of a video mixer, audio mixer, real-time video editing, social integration, the ability to utilize pre-recorded content streaming, data analysis, CRM integrations, etc.

In one implementation, platform 500 makes use of various protocols and services, including but not limited to:

Session Initiation Protocol (SIP): A signaling protocol used to create, hold and control communications sessions. SIP may be used, for example, for audio calls to connect to and provide an audio content feed to server devices 160.

Real-Time Messaging Protocol (RTMP): A communication protocol for streaming audio, video, and data over the Internet. RTMP may be used by content sources to stream content to server devices 160. RTMP may also be used by server devices 160 to stream the output video to the producer, to audience devices, and/or to a video distribution service.

WebRTC (Web Real-Time Communication): A free and open-source project providing web browsers and mobile applications with real-time communication (RTC) via application programming interfaces (APIs).

Web Socket: A computer communications protocol that provides full-duplex communication channels over a single TCP connection. WebSocket may be used to ensure that content is made available in real time. For example, Web Socket may be used that questions posed by audience members are displayed to the producer in real time (and/or automatically added to the output video in real time).

HTTP Live Streaming (HLS): A HTTP-based adaptive bitrate streaming communications protocol developed by Apple Inc. and released in 2009. Support for the protocol is widespread in media players, web browsers, mobile devices, and streaming media servers.

JSON Web Token (JWT): An open standard (RFC 7519) that defines a compact and self-contained way for securely transmitting information between parties as a JSON object. This information can be verified and trusted because it is digitally signed. JWT may be used, for example, to ensure that only authorized audience members are able to view the output video.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
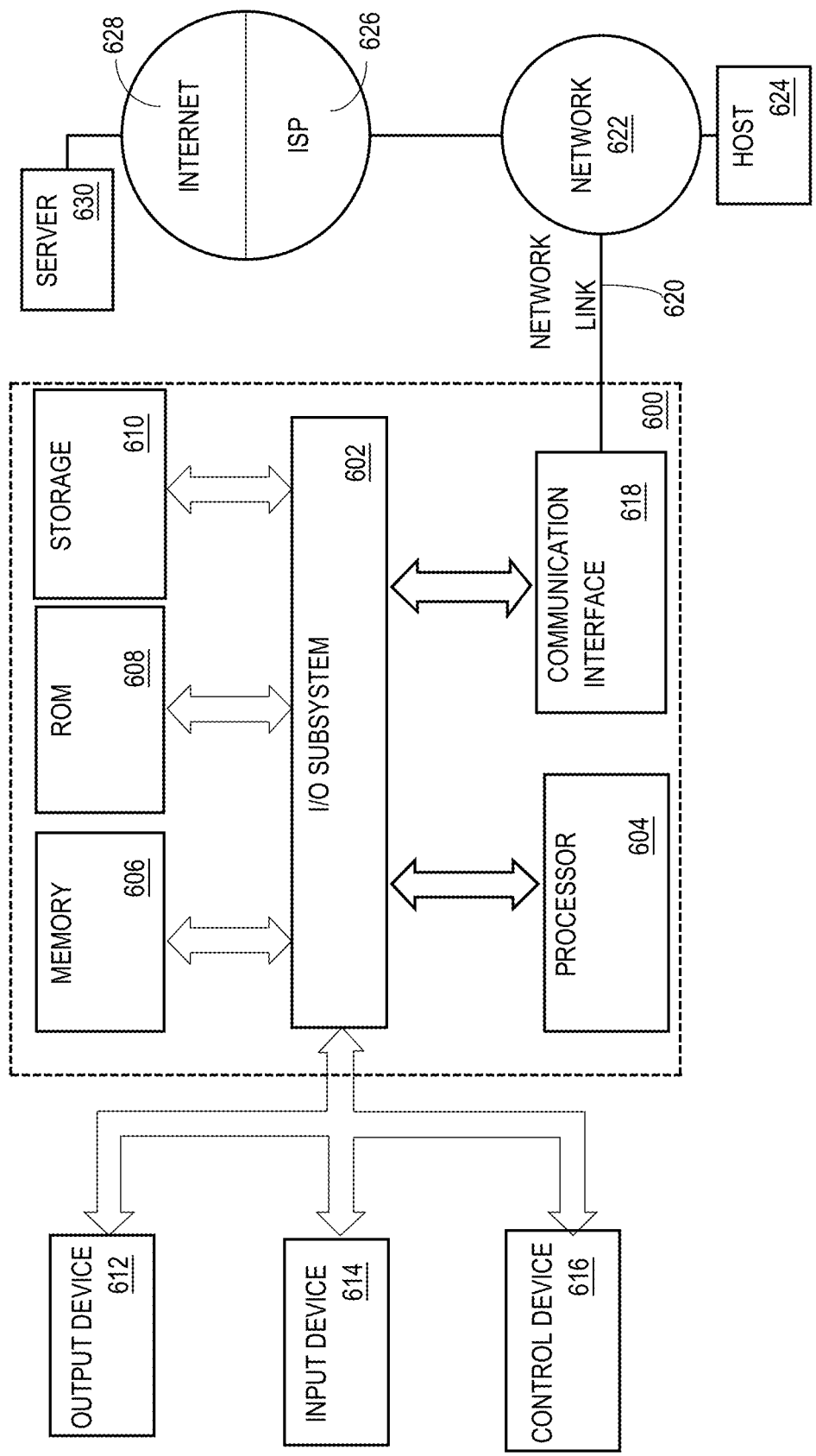
FIG. 6 is a block diagram of a computer system that may be used to implement the techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for modifying, in real-time, a video stream that is being created from content that is streaming from one or more content sources, comprising:
   receiving one or more content streams, at a set of one or more server devices that belong to a cloud network, from one or more remote source devices that are communicatively coupled to but do not belong to the cloud network;
   while receiving the one or more content streams:
   receiving production commands, at the set of one or more server devices, in real-time, from a remote production-control device that communicatively coupled to but does not belong to the cloud network;

producing, in real-time, by the set of one or more server devices, a single output video that: is based on content from the one or more content streams, and reflects editing operations specified in the production commands; wherein the method is performed by one or more computing devices;

wherein: producing, in real-time, the single output video includes producing the single output video based on a first set of production commands received from the remote production-control device; and while producing the single output video based on the first set of production commands received from the remote production-control device, receiving one or more new production commands that specify one or more changes in how to produce the single output video; and in response to the one or more new production commands, changing, in real-time, how the single output video is produced to cause the single output video to reflect the one or more changes;

wherein: the one or more content streams include a plurality of content streams;

and the one or more changes include a change that only affects a particular content stream of the plurality of content streams; and the set of one or more server devices make the change to the particular content stream prior to combining the particular content stream with other content streams to produce the single output video.

2. The method of claim 1 wherein: the one or more changes include a change of which content streams of the plurality of content streams are included in the single output video.

3. The method of claim 1 wherein: the one or more changes include a change of layout of how the plurality of content streams are reflected in the single output video.

4. The method of claim 1 wherein the one or more changes include a change of a background used in the single output video.

5. The method of claim 1 wherein the one or more changes include addition of content, from a source other than the plurality of content streams, to include in the single output video.

6. The method of claim 5 wherein the source is a chat session that is being held, in real-time, with an audience to whom the single output video is being streamed.

7. The method of claim 1 wherein: the set of one or more server devices execute a video mixer and an audio mixer; and producing the single output video is performed by using the video mixer and the audio mixer to combine content from the plurality of content streams.

8. The method of claim 1 further comprising the set of one or more server devices streaming the single output video to the remote production-control device to enable a user of the remote production-control device to view, in real time, the one or more changes.

9. The method of claim 1 further comprising the one or more server devices transmitting the single output video, in real-time, to a video distribution service to enable viewing of the single output video by users of the video distribution service.

10. The method of claim 1 wherein: the output video is streamed to one or more audience devices through a video distribution service; and the one or more server devices transmit the output video directly, without use of the video distribution service, to the remote production-control device to enable a user of the production-control device to preview, in near real-time, changes made responsive to the production commands.

11. One or more non-transitory storage media storing instructions for modifying, in real-time, a video stream that is being created from content that is streaming from one or more content sources, the instructions comprising instructions which, when executed, cause:

receiving one or more content streams, at a set of one or more server devices that belong to a cloud network, from one or more remote source devices that are communicatively coupled to but do not belong to the cloud network;

while receiving the one or more content streams: receiving production commands, at the set of one or more server devices, in real-time, from a remote production-control device that communicatively coupled to but does not belong to the cloud network;

producing, in real-time, by the set of one or more server devices, a single output video that: is based on content from the one or more content streams, and reflects editing operations specified in the production commands;

wherein: producing, in real-time, the single output video includes producing the single output video based on a first set of production commands received from the remote production-control device; and while producing the single output video based on the first set of production commands received from the remote production-control device, receiving one or more new production commands that specify one or more changes in how to produce the single output video; and in response to the one or more new production commands, changing, in real-time, how the single output video is produced to cause the single output video to reflect the one or more changes;

wherein: the one or more content streams include a plurality of content streams; and the one or more changes include a change that only affects a particular content stream of the plurality of content streams; and the instructions cause the set of one or more server devices to make the change to the particular content stream prior to combining the particular content stream with other content streams to produce the single output video.

12. The one or more non-transitory storage media of claim 11 wherein: the one or more changes include a change of which content streams of the plurality of content streams are included in the single output video.

13. The one or more non-transitory storage media of claim 11 wherein: the one or more changes include a change of layout of how the plurality of content streams are reflected in the single output video.

14. The one or more non-transitory storage media of claim 11 further comprising instructions for causing the set of one or more server devices to stream the single output video to the remote production-control device to enable a user of the remote production-control device to view, in real time, the one or more changes.

15. The one or more non-transitory storage media of claim 11 further comprising instructions for causing the one or more server devices to transmit the single output video, in real-time, to a video distribution service to enable viewing of the single output video by users of the video distribution service.

16. The one or more non-transitory storage media of claim 11 wherein: the output video is streamed to one or more audience devices through a video distribution service; and the one or more server devices transmit the output video directly, without use of the video distribution service, to the remote production-control device to enable a user of the production-control device to preview, in near real-time, changes made responsive to the production commands.

\* \* \* \* \*